United States Patent
Ando et al.

(10) Patent No.: US 10,707,623 B2
(45) Date of Patent: Jul. 7, 2020

(54) CHARGING SYSTEM FOR VEHICLE

(71) Applicant: Toyota Jidosha Kabushiki Kaisha, Toyota-shi, Aichi-ken (JP)

(72) Inventors: Toru Ando, Obu (JP); Hisanori Ito, Nagoya (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 16/225,955

(22) Filed: Dec. 19, 2018

(65) Prior Publication Data

US 2019/0199037 A1    Jun. 27, 2019

(30) Foreign Application Priority Data

Dec. 22, 2017    (JP) ................................. 2017-246677

(51) Int. Cl.
| | |
|---|---|
| *H01R 13/639* | (2006.01) |
| *B60K 1/04* | (2019.01) |
| *H01R 13/64* | (2006.01) |
| *B60L 53/20* | (2019.01) |
| *B60L 53/60* | (2019.01) |
| *B60L 53/16* | (2019.01) |

(52) U.S. Cl.
CPC ........... *H01R 13/6397* (2013.01); *B60K 1/04* (2013.01); *B60L 53/16* (2019.02); *B60L 53/20* (2019.02); *B60L 53/60* (2019.02); *H01R 13/64* (2013.01); *B60L 2210/30* (2013.01); *B60L 2250/16* (2013.01); *B60L 2250/24* (2013.01)

(58) Field of Classification Search
CPC ..... H01R 13/6397; H01R 13/64; B60L 53/16; B60L 53/20; B60L 53/30; B60L 53/305; B60L 53/60; B60L 53/66; B60L 53/68; B60L 2210/30; B60L 2250/16; B60L 2270/30; B60L 2270/32; B60L 2250/24; B60K 1/04
USPC .................................. 340/5.2; 439/133, 304
See application file for complete search history.

(56) References Cited

U.S. PATENT DOCUMENTS

| | | | | |
|---|---|---|---|---|
| 5,627,448 | A * | 5/1997 | Okada ....................... | B60L 3/12 439/133 |
| 2011/0201223 | A1* | 8/2011 | Kurumizawa ..... | H01R 13/6275 439/345 |
| 2011/0281452 | A1* | 11/2011 | Kurumizawa .......... | B60L 53/65 439/304 |
| 2011/0294328 | A1* | 12/2011 | Katagiri ............. | H01R 13/6275 439/304 |

(Continued)

FOREIGN PATENT DOCUMENTS

JP     2016-085786 A     5/2016

*Primary Examiner* — Edwin C Holloway, III
(74) *Attorney, Agent, or Firm* — Dinsmore & Shohl LLP

(57) ABSTRACT

In a vehicle capable of external charging, when the connection of an inlet of the vehicle with a charging cable is detected, an ECU transmits a locking command to a locking device. When it is determined that the locking device is in a locked state, the ECU permits external charging, and when it is determined that the locking device is not in the locked state, the ECU does not permit external charging. When the ECU does not permit external charging, the ECU displays information about manual locking by manual operation. When it is determined that the locking device is in the locked state after the ECU does not permit external charging, the ECU permits external charging.

3 Claims, 6 Drawing Sheets

(56) References Cited

U.S. PATENT DOCUMENTS

| | | | | |
|---|---|---|---|---|
| 2012/0047971 A1* | 3/2012 | Katagiri | ............... | B60L 53/16 |
| | | | | 70/58 |
| 2012/0083148 A1* | 4/2012 | Hirashita | ........... | H01R 13/6275 |
| | | | | 439/304 |
| 2012/0186309 A1* | 7/2012 | Ishida | ................... | B60L 53/11 |
| | | | | 70/57 |
| 2012/0238122 A1* | 9/2012 | Hirashita | ................ | B60L 53/65 |
| | | | | 439/304 |
| 2013/0102163 A1* | 4/2013 | Basavarajappa | ....... | B60K 15/05 |
| | | | | 439/34 |
| 2017/0297443 A1* | 10/2017 | You | .................... | B60L 11/1818 |
| 2018/0316136 A1* | 11/2018 | Cho | .................... | H01R 13/639 |
| 2018/0370378 A1* | 12/2018 | Konishi | .............. | B60L 11/1838 |

\* cited by examiner

CHARGING SYSTEM FOR VEHICLE

CROSS REFERENCE TO RELATED APPLICATIONS

This nonprovisional application claims priority to Japanese Patent Application 2017-246677 filed on Dec. 22, 2017 with the Japan Patent Office, the entire contents of which are hereby incorporated by reference.

BACKGROUND

Field

The present disclosure relates to a charging system for a vehicle capable of external charging in which a vehicle-mounted power storage device is charged using electric power supplied through a charging cable from outside the vehicle.

Description of the Background Art

Such a vehicle capable of external charging sometimes includes a locking device for preventing engagement between a charging connector of the charging cable and an inlet of the vehicle from being released due to tampering by third parties and the like. The locking device is configured to switch between a locked state in which the charging connector cannot be removed from the inlet and an unlocked state in which the charging connector can be removed from the inlet.

Japanese Patent Laying-Open No. 2016-85786 discloses a locking device for a charging connector mounted on a vehicle capable of external charging. Upon connection of an inlet with the charging connector, this locking device is switched from an unlocked state to a locked state by control of a controller of the vehicle.

SUMMARY

In a vehicle including the aforementioned locking device, if external charging is performed with the locking device being in an unlocked state, a situation may arise where a charging connector is removed from an inlet while a current higher than a predetermined value is flowing. One possible way to avoid such a situation is a charging system for a vehicle that permits external charging only when a locking device is in a locked state.

When a user is to perform external charging of a vehicle having the aforementioned charging system mounted thereon, however, a situation may arise where a locking device cannot be switched to a locked state by control of a controller due to a fault of the locking device and the like. In such a case, it is feared that external charging will not be permitted against the user's will.

The present disclosure has been made to solve the aforementioned problem, and has an object to allow external charging even when a locking device cannot be switched to a locked state by control of a controller of a vehicle.

A charging system for a vehicle according to the present disclosure is a charging system for a vehicle having a power storage device that can be charged using electric power supplied through a charging cable from outside the vehicle. The charging system includes: an inlet connectable to a charging connector provided at a front end of the charging cable; a locking device configured to switch between a locked state in which the charging connector cannot be removed from the inlet and an unlocked state in which the charging connector can be removed from the inlet; a detection device configured to detect the locked state; and a controller configured to control charging of the power storage device. The locking device is configured to switch from the unlocked state to the locked state by receiving a locking command from the controller, or by a user's manual operation. The controller is configured to, after transmitting the locking command to the locking device, permit charging of the power storage device when the locked state is detected, and not permit charging of the power storage device when the locked state is not detected.

According to the configuration described above, even when switching to the locked state by the locking command from the controller is impossible due to a fault of the locking device and the like, by performing switching to the locked state by a user's manual operation, the locked state is detected. Accordingly, external charging is allowed.

When the controller does not permit charging of the power storage device after transmitting the locking command, and then the locked state is detected, the controller is configured to permit charging of the power storage device.

According to the configuration described above, even when external charging is not permitted after the transmission of the locking command, by performing switching to the locked state by a user's manual operation thereafter, the locked state is detected. Accordingly, external charging is allowed.

When the controller does not permit charging of the power storage device after transmitting the locking command, the controller is configured to transmit the locking command again to the locking device.

According to the configuration described above, even when external charging is not permitted after the transmission of the locking command, external charging is permitted when the locked state is detected by the repeated transmission of the locking command thereafter. The reason why the locking device was not switched to the locked state may not have been due to a fault of the locking device and the like, but may have been because the locking device falsely recognized the locking command due to noise and the like, which resulted in accidental failure to switch from the unlocked state to the locked state. If the aforementioned accidental situation has been cleared at the time of the repeated transmission of the locking command, the locking device is switched to the locked state, and external charging is permitted.

The charging system further includes a notification device configured to provide a notification of information. When the controller does not permit charging of the power storage device after transmitting the locking command, the controller is configured to cause the notification device to provide a notification of information that switching to the locked state by the user's manual operation is possible.

According to the configuration described above, when switching to the locked state by the locking command is impossible due to a fault of the locking device and the like, for example, the user can be notified that switching to the locked state by the user's manual operation is possible. Accordingly, the user can know that the locking device can be switched to the locked state by manual operation. The user's convenience is thus improved.

The foregoing and other objects, features, aspects and advantages of the present disclosure will become more apparent from the following detailed description of the present disclosure when taken in conjunction with the accompanying drawings.

DESCRIPTION OF THE EMBODIMENTS

Figure 1:
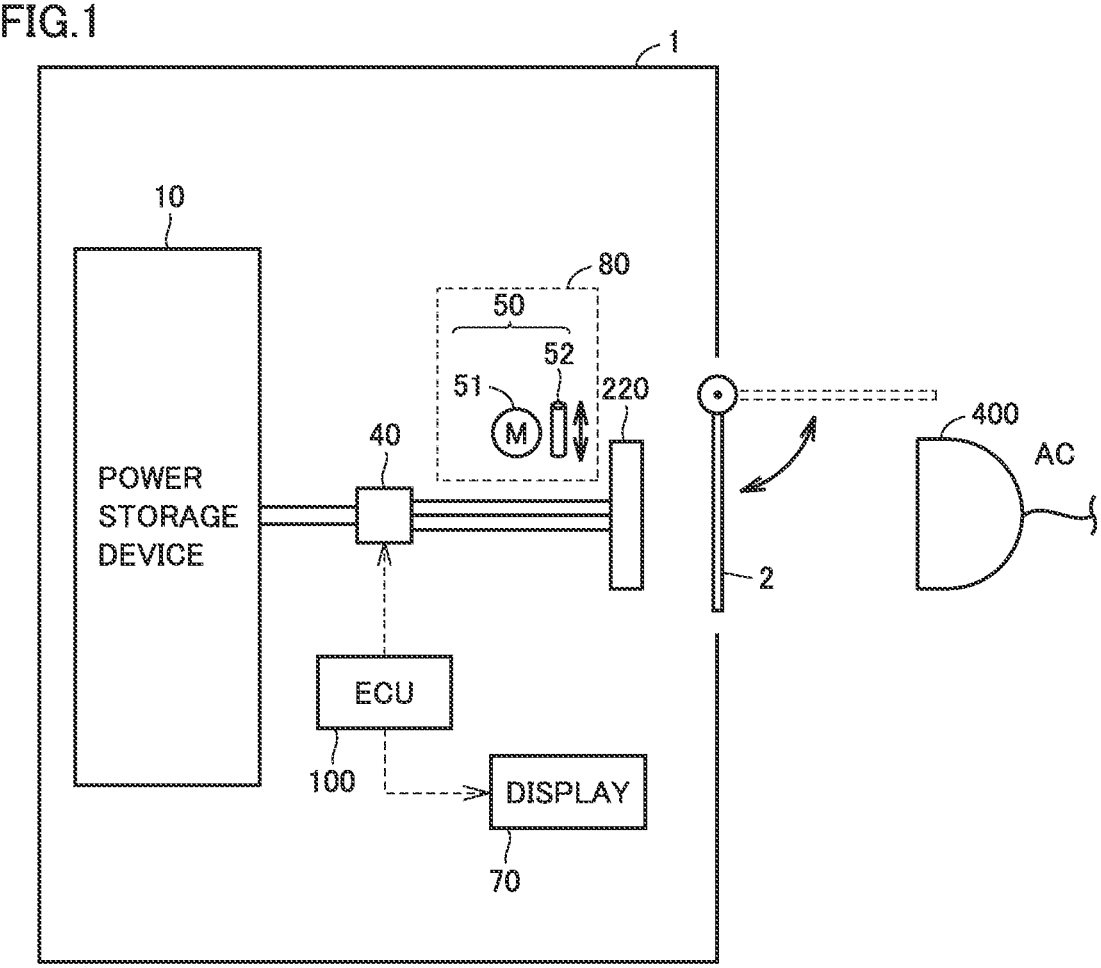
FIG. 1 schematically shows an overall configuration of a vehicle including a charging system according to the present embodiment.

In the following, the present embodiment will be described in detail with reference to the drawings. The same or corresponding parts are designated by the same characters in the drawings and description thereof will not be repeated.

FIG. 1 schematically shows an overall configuration of a vehicle 1 including a charging system according to the present embodiment. Vehicle 1 includes a power storage device 10, an AC (alternating current) inlet 220, a lid 2, a power conversion device 40, an ECU (Electronic Control Unit) 100, and a display 70.

Power storage device 10 is configured to be chargeable/dischargeable. Power storage device 10 includes a secondary battery such as a nickel-metal hydride battery or a lithium ion battery.

Vehicle 1 is an electrically powered vehicle (such as a hybrid vehicle or an electric vehicle) capable of traveling using electric power stored in power storage device 10. Vehicle 1 is configured to receive electric power from a charging connector 410 of a charging cable (FIG. 2) connected to an AC power supply external to the vehicle.

Inlet 220 is connectable to charging connector 410. Lid 2 is configured to be opened/closed with respect to inlet 220. Once lid 2 is opened and charging connector 410 is connected to inlet 220, vehicle 1 allows power storage device 10 to be charged using AC power supplied from charging connector 410.

Power conversion device 40 is connected between inlet 220 and power storage device 10. Power conversion device 40 is activated by a control signal from ECU 100, to convert the AC power received by inlet 220 from charging connector 410 into electric power with which power storage device 10 can be charged, and supply the converted power to power storage device 10. Power storage device 10 is thus charged using the AC power supplied from charging connector 410.

ECU 100 controls charging of power storage device 10. ECU 100 permits external charging when a locking device 50 is in a locked state, and does not permit external charging when locking device 50 is in an unlocked state.

When the connection of charging connector 410 with inlet 220 is detected, ECU 100 transmits a locking command to switch locking device 50 from the unlocked state to the locked state to locking device 50. Upon completion of external charging, by a user's predetermined operation and the like, ECU 100 transmits an unlocking command to switch locking device 50 from the locked state to the unlocked state to locking device 50.

Vehicle 1 further includes a connector locking device 80 including locking device 50 for charging connector 410. Locking device 50 includes a connector lock pin 52 and an actuator 51. The configuration of connector locking device 80 other than locking device 50 will be described in detail later.

Connector lock pin 52 is a component for creating the locked state in which charging connector 410 cannot be removed from inlet 220, and the unlocked state in which charging connector 410 can be removed from inlet 220. Connector lock pin 52 is movable in a pin shaft direction.

Actuator 51 is an electric actuator (motor) for moving connector lock pin 52 in the pin shaft direction. When a current flows through actuator 51 in one direction (locking direction), actuator 51 performs locking operation of moving connector lock pin 52 to a predetermined locking position. Charging connector 410 thus enters the locked state. When a current flows through actuator 51 in a direction opposite to the locking direction (unlocking direction), actuator 51 performs unlocking operation of moving connector lock pin 52 to a predetermined unlocking position. Charging connector 410 thus enters the unlocked state. As will be described later, actuator 51 can perform the locking operation and the unlocking operation by the user's manual operation as well.

Display 70 receives information and the like which will be described later from ECU 100, and displays the received various pieces of information. Although the present embodiment describes an example where vehicle 1 includes display 70, the function of display 70 may be imparted to a navigation device included in vehicle 1, for example. It should be noted that display 70 according to the present embodiment corresponds to an example of "notification device" according to the present disclosure.

Figure 2:
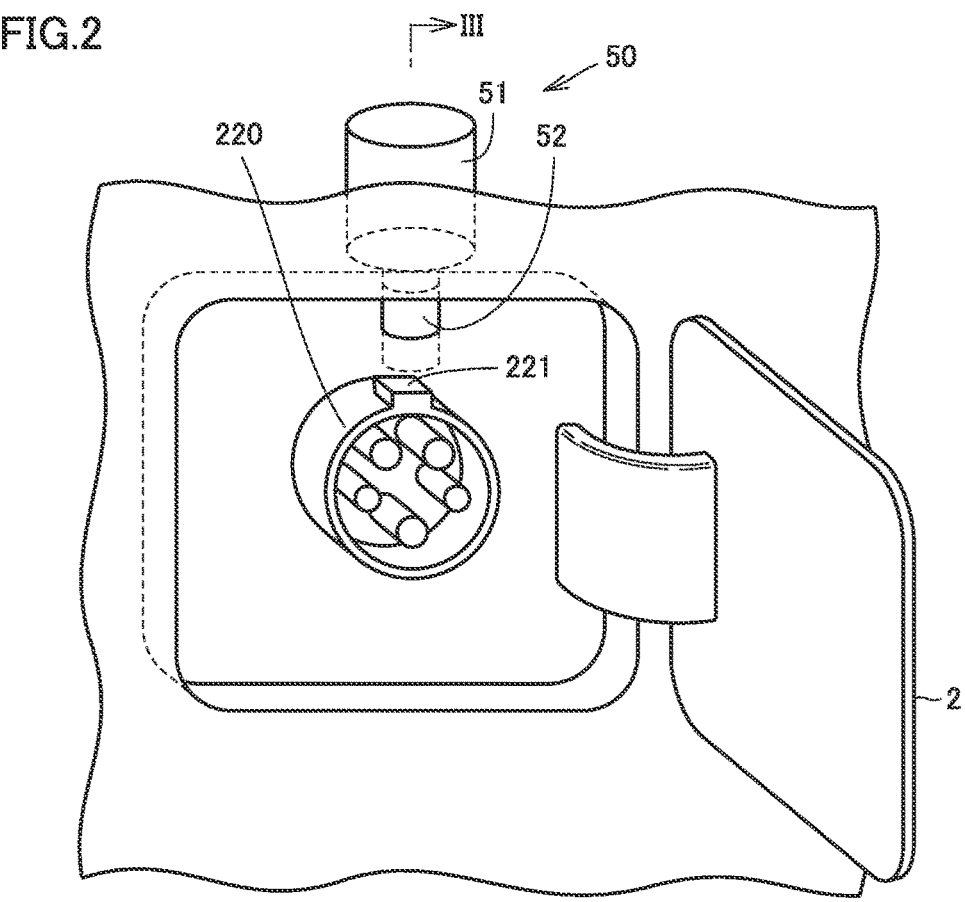
FIG. 2 shows the periphery of an inlet and the structure of a charging cable.
Figure 2:
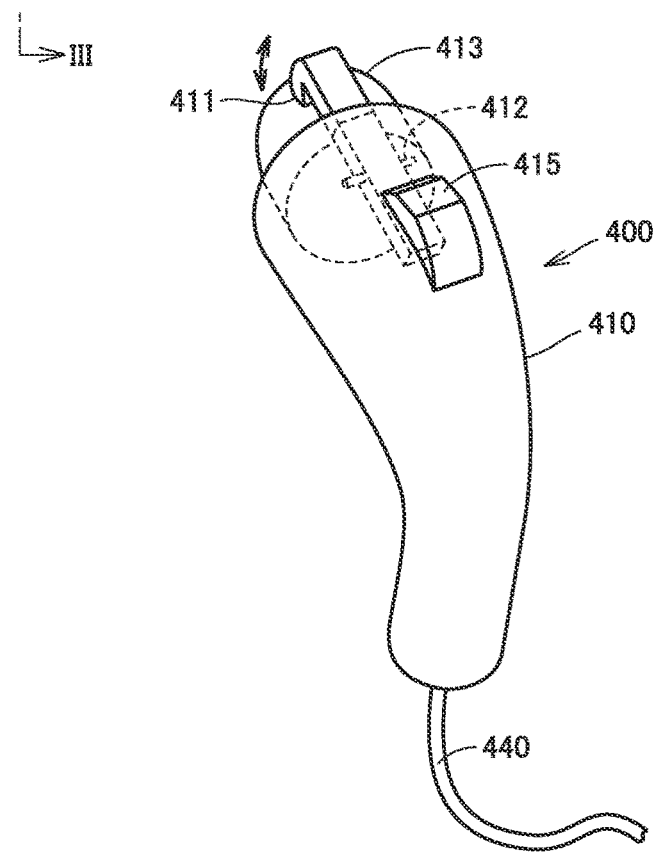

FIG. 2 shows the periphery of inlet 220 and the structure of a charging cable 400. In the present embodiment, locking device 50 is provided above inlet 220 (in the vicinity of inlet 220).

Charging cable 400 includes charging connector 410 and an AC power line 440. Charging cable 400 supplies electric power from the power supply external to vehicle 1 to inlet 220 via AC power line 440.

Charging connector 410 is provided at its tip with a connection portion 413, which is connected to inlet 220 in an electrically conductive manner. Charging connector 410 is provided with a link 411. This link 411 is attached in a manner rotatable around a shaft 412. Link 411 has one end provided with a projecting portion to engage with a protrusion 221 of inlet 220, and the other end provided with a push button 415. Link 411 is elastically biased by a spring 414 with respect to a main body of charging connector 410 (see FIGS. 3 and 4). Charging connector 410 includes a detection circuit (not shown) for detecting the connection of charging cable 400. Upon electrical connection of charging connector 410 with inlet 220, a connection signal (proximity detection signal) PISW indicating electrical connection to charging cable 400 is transmitted to ECU 100 via inlet 220. When ECU 100 receives PISW, ECU 100 determines that charging connector 410 and inlet 220 are now electrically connected to each other.

Figure 3:
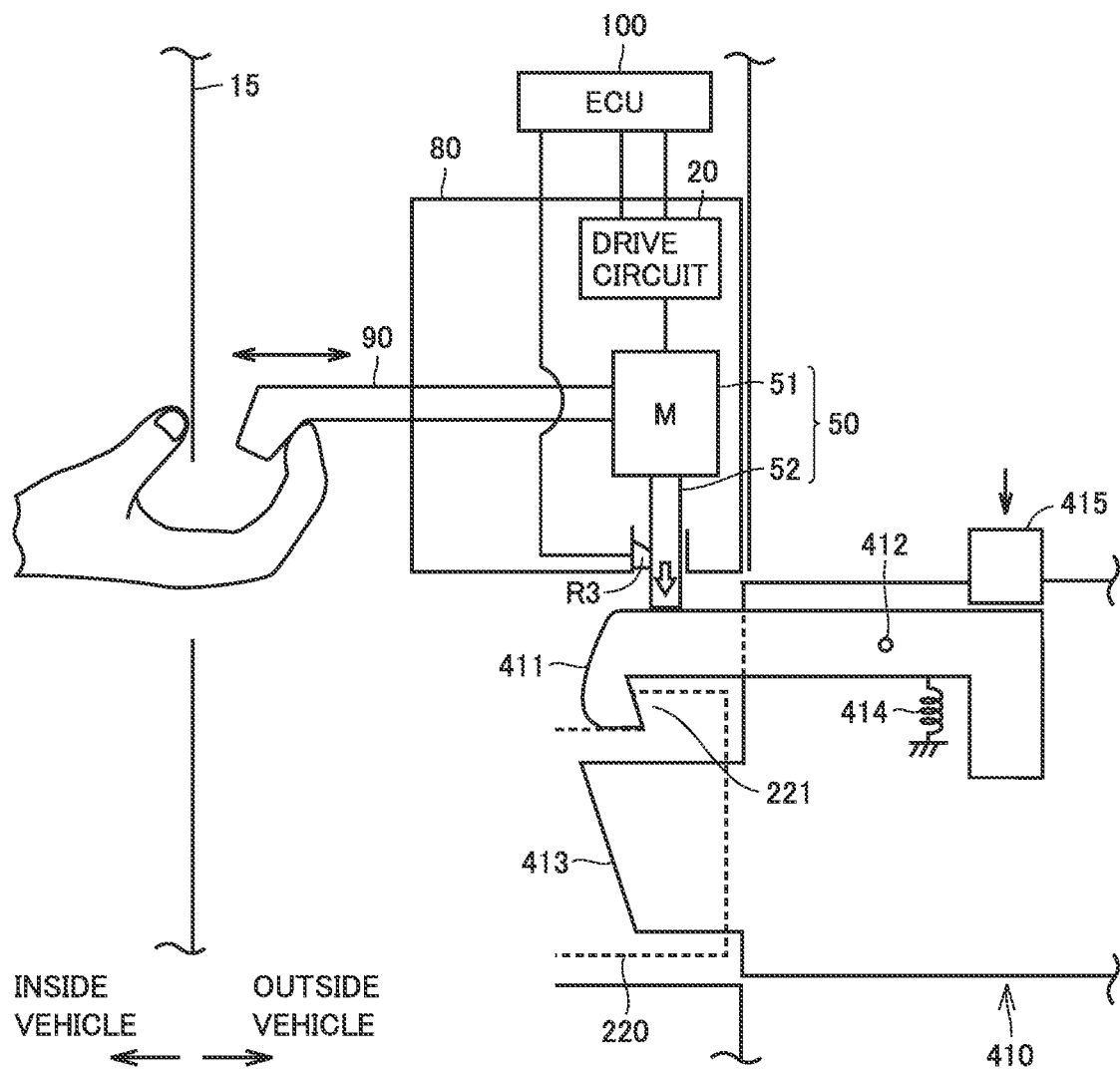
FIG. 3 is a cross-sectional view (No. 1) taken along the line in FIG. 2.
Figure 4:
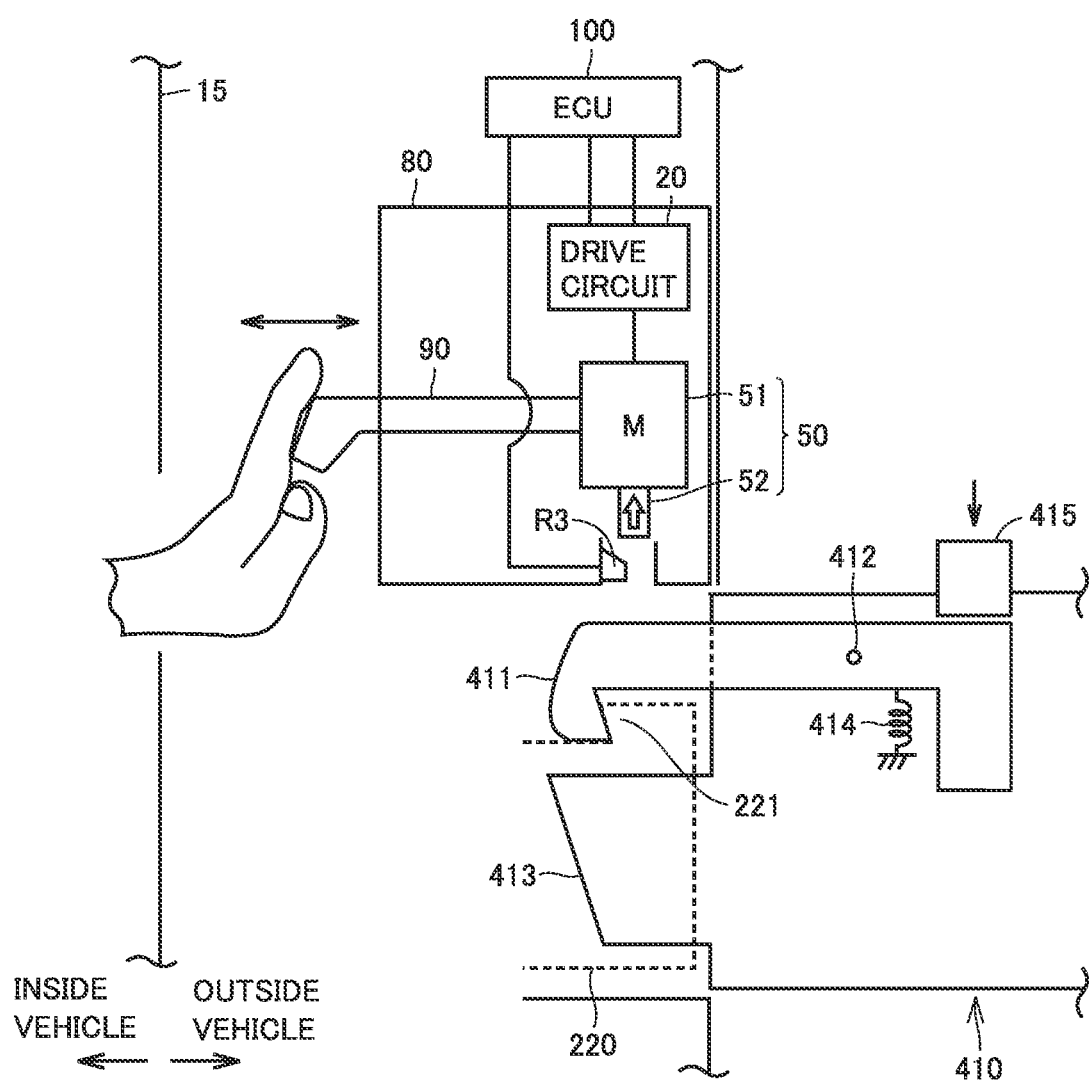
FIG. 4 is a cross-sectional view (No. 2) taken along the line in FIG. 2.

FIGS. 3 and 4 are cross-sectional views taken along the line in FIG. 2. FIG. 3 shows locking device 50 in the locked state. FIG. 4 shows locking device 50 in the unlocked state. Connector locking device 80 including locking device 50 according to the present embodiment is described using FIGS. 3 and 4.

Connector locking device 80 includes locking device 50, a drive circuit 20, a manual operation component 90, and a lock detection switch R3. Locking device 50 includes actuator 51 and connector lock pin 52 as described above.

Drive circuit 20 generates a current for driving actuator 51 of locking device 50 based on a command received from ECU 100 to switch the state of the locking device, and passes the current through actuator 51. Specifically, when drive circuit 20 receives from ECU 100 the locking command to switch locking device 50 from the unlocked state to the locked state, drive circuit 20 passes a current through actuator 51 in the locking direction. When drive circuit 20 receives from ECU 100 the unlocking command to switch locking device 50 from the locked state to the unlocked state, on the other hand, drive circuit 20 passes a current through actuator 51 in the unlocking direction.

Manual operation component 90 is an operating lever to be manually operated by the user to perform the locking operation and the unlocking operation of actuator 51. Manual operation component 90 is used as an emergency operating lever. The emergency refers to a situation where the state of locking device 50 cannot be switched by the locking command or the unlocking command from ECU 100 due to a fault of locking device 50 and the like. Manual operation component 90 is provided, as shown in FIGS. 3 and 4, such that it can be operated by the user's hand inserted through an opening provided in an inner panel 15 of vehicle 1. In the present embodiment, manual operation component 90 is operated in a direction toward the inside of the vehicle in FIG. 3, to cause actuator 51 to perform the locking operation. Manual operation component 90 is operated in a direction toward the outside of the vehicle in FIG. 3, on the other hand, to cause actuator 51 to perform the unlocking operation.

In the present embodiment, as an example, manual operation component 90 is provided with a gear (not shown) which engages with actuator (motor) 51 to allow manual operation of actuator 51. By operating aforementioned manual operation component 90 in the direction toward the inside of the vehicle in FIG. 3, this gear operates actuator 51 so as to move connector lock pin 52 in the locking direction. By operating aforementioned manual operation component 90 in the direction toward the outside of the vehicle in FIG. 3, this gear operates actuator 51 so as to move connector lock pin 52 in the unlocking direction.

Although the present embodiment describes an example where actuator 51 is the object to be operated by the operation of manual operation component 90, it is only required that locking device 50 can be switched between the locked state and the unlocked state by the operation of manual operation component 90. For example, locking device 50 may include an electric actuator and a manual actuator each capable of switching connector lock pin 52 between a locked state and an unlocked state. In this case, the electric actuator is operated via drive circuit 20 by a switching command from ECU 100, while the manual actuator is operated by the operation of manual operation component 90, causing locking device 50 to be switched between the locked state and the unlocked state.

Connector locking device 80 is provided with lock detection switch R3 for detecting the locked state of locking device 50. Lock detection switch R3 is arranged to be pushed by connector lock pin 52 when connector lock pin 52 moves to the locking position (locking operation). FIG. 3 shows lock detection switch R3 being pushed by connector lock pin 52. Lock detection switch R3 is arranged such that it enters a closed state when pushed by connector lock pin 52, and is maintained in the closed state (ON state) during the locked state.

Lock detection switch R3 is arranged to move out of contact with connector lock pin 52 when connector lock pin 52 moves to the unlocking position (unlocking operation). FIG. 4 shows lock detection switch R3 not being pushed by connector lock pin 52. Lock detection switch R3 is arranged such that it enters an opened state when not pushed by connector lock pin 52, and is maintained in the opened state (OFF state) during the unlocked state.

Figure 5:
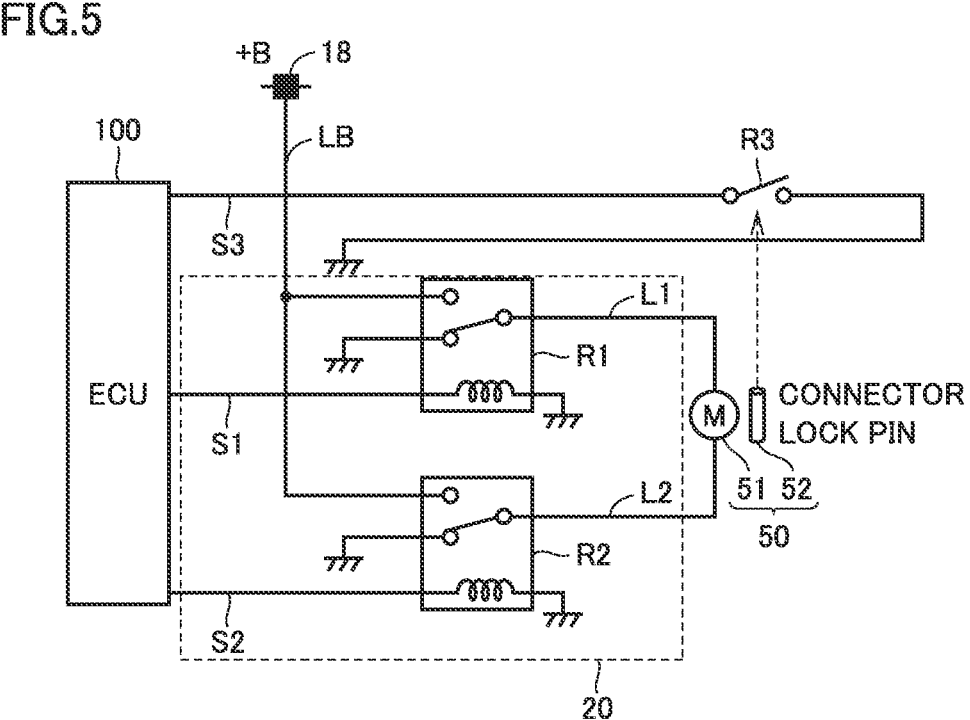
FIG. 5 shows an exemplary configuration of a drive circuit and a lock detection switch.

FIG. 5 shows an exemplary configuration of drive circuit 20 and lock detection switch R3. This drive circuit 20 includes a power supply line LB to which electric power from a power supply 18 is supplied, a first power line L1, a lock relay R1 connected to one end of first power line L1, a second power line L2, and an unlock relay R2 connected to one end of second power line L2.

Lock relay R1 is configured to switch, in accordance with the locking command transmitted from ECU 100 via a signal line S1, the object to be connected to the one end of first power line L1 between power supply line LB and a ground (portion having a reference potential).

Unlock relay R2 is configured to switch, in accordance with the unlocking command transmitted from ECU 100 via a signal line S2, the object to be connected to the one end of second power line L2 between power supply line LB and the ground.

Lock relay R1 and unlock relay R2 are gang-controlled such that one of first power line L1 and second power line L2 is connected to power supply line LB and the other is connected to the ground.

Actuator 51 is connected between the other end of first power line L1 and the other end of second power line L2. Once lock relay R1 connects first power line L1 to power supply line LB, a current in the locking direction flows from first power line L1 to actuator 51, causing the locking operation of connector lock pin 52 to take place. Once unlock relay R2 connects second power line L2 to power supply line LB, on the other hand, a current in the unlocking direction (opposite to the locking direction) flows from second power line L2 to actuator 51, causing the unlocking operation of connector lock pin 52 to take place.

Lock detection switch R3 is connected to ECU 100 via a signal line S3. As described above, when the locking operation of connector lock pin 52 takes place, lock detection switch R3 enters the closed state by the operation of connector lock pin 52. When the unlocking operation of connector lock pin 52 takes place, on the other hand, lock detection switch R3 enters the opened state by the operation of connector lock pin 52.

ECU 100 detects the opened/closed state of lock detection switch R3 based on a potential acquired via signal line S3. When ECU 100 detects the opened state of lock detection switch R3, ECU 100 determines that locking device 50 is in the unlocked state. When ECU 100 detects the closed state of lock detection switch R3, ECU 100 determines that locking device 50 is in the locked state. It should be noted that lock detection switch R3 according to the present embodiment corresponds to an example of "detection device" according to the present disclosure.

In vehicle 1 as described above, external charging is permitted when the locking device is in the locked state, and external charging is not permitted when the locking device is in the unlocked state. As a result, the charging connector is prevented from being removed from the inlet during external charging.

However, a situation may arise where locking device 50 cannot be switched to the locked state by the locking command from ECU 100 due to a fault of the locking device and the like. In such a case, it is feared that external charging will not be started against the user's will.

When external charging is not permitted after the transmission of the locking command, ECU 100 according to the present embodiment causes display 70 to indicate a message that manual locking by the operation of manual operation component 90 is possible, and a method for manual locking by the operation of manual operation component 90. Once locking device 50 is switched to the locked state by the user's operation of manual operation component 90, and the locked state of the locking device is detected, ECU 100 permits external charging. As a result, even when switching to the locked state by the locking command is impossible due to a fault of locking device 50 and the like, locking device 50 is switched to the locked state by the operation of manual operation component 90, so that external charging can be allowed.

Figure 6:
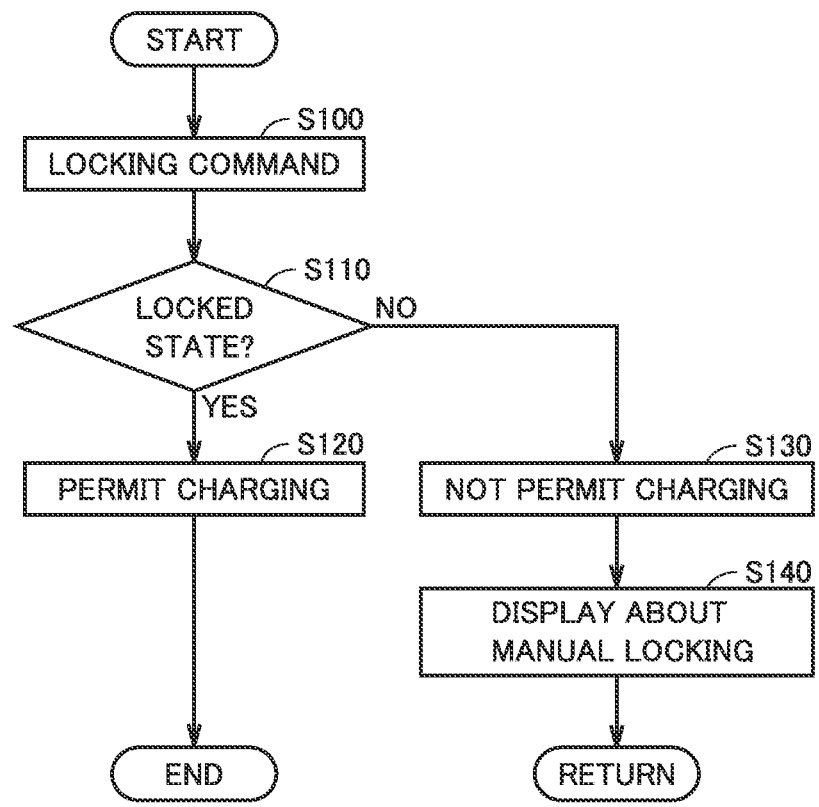
FIG. 6 is a flowchart showing a process performed by an ECU during external charging according to the present embodiment.

FIG. 6 is a flowchart showing a process performed by ECU 100 during external charging according to the present embodiment. This flowchart is performed each time the connection of charging connector 410 with inlet 220 is detected. Although each step shown in the flowchart of FIG. 6 is implemented by software processing by ECU 100, the process may be partially implemented by hardware (electric circuit) fabricated within ECU 100. The same applies to each step shown in the flowchart of FIG. 7.

When the connection of charging connector 410 with inlet 220 is detected, ECU 100 transmits the locking command to locking device 50 (step 100; a step being referred to as "S" for short hereinafter).

ECU 100 determines whether or not locking device 50 has been switched to the locked state by the locking command (whether or not connector lock pin 52 has moved to the locking position) (S110). As described above, this determination is made by ECU 100 based on the detection of the opened state or the closed state of lock detection switch R3.

When ECU 100 determines in S110 that locking device 50 is in the locked state (YES in S110), ECU 100 permits external charging (S120).

When ECU 100 determines in S110 that locking device 50 has not been switched to the locked state and is in the unlocked state (NO in S110), ECU 100 does not permit external charging (S130). The reason why locking device 50 is not switched to the locked state by the locking command may be due to a fault of locking device 50 and the like.

After ECU 100 does not permit external charging, ECU 100 causes display 70 to indicate a message that manual locking by the operation of manual operation component 90 is possible, and a method for manual locking by the operation of manual operation component 90 (S140). Manual operation component 90 is provided as an emergency operating lever. Thus, the user may not know the installation location of manual operation component 90 or how to operate manual operation component 90. By providing the aforementioned indication, the user can know that locking device 50 can be switched to the locked state by manual operation. The user's convenience is thus improved. ECU 100 then causes the process to proceed to "RETURN," to repeat the process from S100 to S140.

When locking device 50 is switched to the locked state by the user's manual operation of manual operation component 90, ECU 100 determines in S110 that locking device 50 is in the locked state (YES in S110). When ECU 100 determines that locking device 50 is in the locked state, ECU 100 permits external charging (S120). As a result, even when switching to the locked state by the locking command is impossible due to a fault of the locking device and the like, locking device 50 is switched to the locked state by the operation of manual operation component 90, so that external charging can be allowed.

As described above, in the present embodiment, when the connection of charging connector 410 with inlet 220 is detected, ECU 100 transmits the locking command to locking device 50. When ECU 100 determines that the locking device has been switched to the locked state by the locking command, ECU 100 permits external charging. When ECU 100 determines that the locking device has not been switched to the locked state by the locking command, ECU 100 does not permit external charging.

After ECU 100 does not permit external charging, ECU 100 causes display 70 to indicate a message that manual locking by the operation of manual operation component 90 is possible, and a method for manual locking by the operation of manual operation component 90. When ECU 100 determines that locking device 50 has been switched to the locked state by the user's operation of manual operation component 90 and the locking device is in the locked state, ECU 100 permits external charging. As a result, even when switching to the locked state by the locking command is impossible due to a fault of the locking device and the like, locking device 50 is switched to the locked state by the operation of manual operation component 90, so that external charging can be allowed.

<Modification>

In the above embodiment, when locking device 50 was not switched to the locked state after the transmission of the locking command, ECU 100 causes display 70 to indicate a message that switching to the locked state by the operation of manual operation component 90 is possible, and a method for manual locking by the operation of manual operation component 90. In the following, the message that manual locking by the operation of manual operation component 90 is possible, and the method for manual locking by the operation of manual operation component 90 are also referred to as "information about manual locking." When locking device 50 was not switched to the locked state after the transmission of the locking command, ECU 100 may transmit the locking command again to locking device 50 before causing display 70 to indicate the information about manual locking.

For example, the reason why locking device 50 was not switched from the unlocked state to the locked state may not have been due to a fault of locking device 50 and the like, but may have been because locking device 50 falsely recognized the locking command due to noise and the like, which resulted in accidental failure to switch from the unlocked state to the locked state (hereinafter also referred to as "accidental situation"). Accordingly, ECU 100 transmits the locking command again. If the aforementioned accidental situation has been cleared at the time of the repeated transmission of the locking command, locking device 50 is switched to the locked state, and external charging of vehicle 1 is permitted.

In a modification, when locking device 50 was not switched to the locked state by the locking command, ECU 100 transmits the locking command again, and determines whether or not locking device 50 has been switched to the locked state (hereinafter also referred to as "repeated command process"). ECU 100 performs the repeated command process a predetermined number of times, and when the locked state of locking device 50 cannot be detected even by the repeated command process performed the predetermined number of times, ECU 100 causes display 70 to indicate the information about manual locking by the operation of manual operation component 90.

Figure 7:
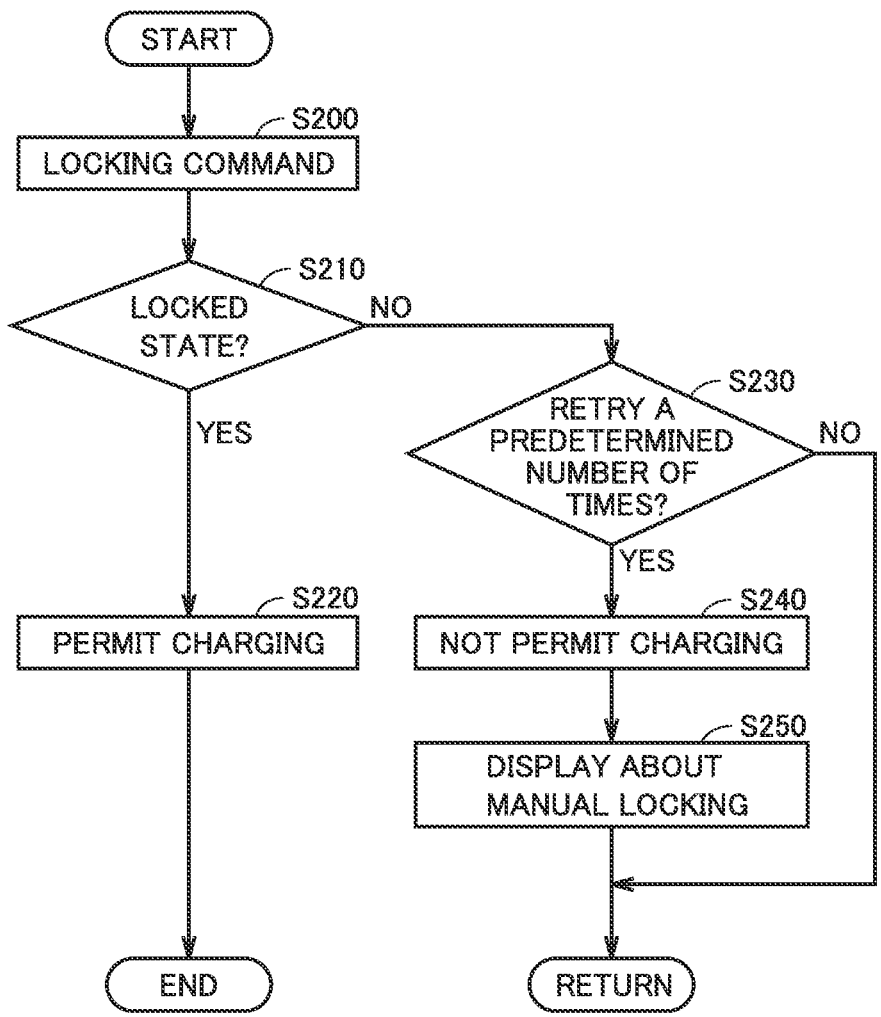
FIG. 7 is a flowchart showing a process performed by the ECU during external charging according to a modification.

FIG. 7 is a flowchart showing a process performed by ECU 100 during external charging according to the modification. This flowchart is performed each time the connection of charging connector 410 with inlet 220 is detected.

Since S200, S210 and S220 in FIG. 7 are the same as S100, S110 and S120 in FIG. 6, respectively, description thereof will not be repeated.

When ECU 100 determines in S210 that locking device 50 has not been switched to the locked state and is in the unlocked state (NO in S210), ECU 100 determines whether or not a retry of transmission of the locking command has been performed a predetermined number of times (S230).

When ECU 100 determines that a retry of transmission of the locking command has not been performed the predetermined number of times (NO in S230), ECU 100 causes the process to proceed to "RETURN," to transmit the locking command again (S200). A retry of transmission of the locking command is performed the predetermined number of times in this manner because, as described above, locking device 50 may have falsely recognized the locking command due to noise and the like, which resulted in accidental failure to switch to the locked state. The predetermined number of times is set arbitrarily in consideration of the frequency and magnitude of noise expected to occur based on circuit characteristics and the like.

When ECU 100 determines in S230 that a retry of transmission of the locking command has been performed the predetermined number of times, ECU 100 does not permit external charging (S240). This is because the lack of detection of the locked state even after a retry of transmission of the locking command has been performed the predetermined number of times may be caused by a fault of locking device 50 and the like.

Then, ECU 100 transmits a message that manual locking by the operation of manual operation component 90 is possible, and a method for manual locking by the operation of manual operation component 90 to display 70, and causes display 70 to indicate them (S250).

As described above, when locking device 50 was not switched to the locked state by the locking command, ECU 100 transmits the locking command again, and determines whether or not locking device 50 has been switched to the locked state (repeated command process). Then, ECU 100 performs the repeated command process the predetermined number of times.

As a result, when locking device 50 was not switched to the locked state due to the accidental situation, it is more likely that locking device 50 can be switched to the locked state by the repeated command process. At the same time, the switching to the locked state can be done without making the user perform manual operation. The user's convenience can thus be improved.

When locking device 50 was not switched to the locked state even by the repeated command process performed the predetermined number of times, ECU 100 causes display 70 to indicate the information about manual locking by the operation of manual operation component 90. Then, once locking device 50 is switched to the locked state by the repeated command process or by manual locking by the operation of manual operation component 90, ECU 100 permits external charging.

<Other Modifications>

Although the locked state and the unlocked state of locking device 50 are determined using lock detection switch R3 in the embodiment, it is only required that the locked state and the unlocked state of the locking device can be determined. For example, a pressure sensor may be provided at a front end of connector lock pin 52 on the side which comes into contact with link 411 when connector lock pin 52 moves to the locking position (locked state). In this case, when connector lock pin 52 moves to the locking position, the pressure sensor is pressed by link 411 and transmits a signal to ECU 100. When ECU 100 detects this signal, ECU 100 determines that locking device 50 is in the locked state. When connector lock pin 52 moves to the unlocking position (unlocked state), the pressure sensor is not pressed, and a signal is not transmitted to ECU 100. When ECU 100 does not detect this signal, ECU 100 determines that locking device 50 is in the unlocked state.

Alternatively, the determination of the locked state or the unlocked state of locking device 50 may be made based on the operating position of connector lock pin 52. ECU 100 determines that locking device 50 is in the locked state when connector lock pin 52 is at the locking position, and determines that locking device 50 is in the unlocked state when connector lock pin 52 is at the unlocking position. For example, ECU 100 determines whether or not connector lock pin 52 has moved to the locking position after transmitting the locking command.

Although the embodiment has described an example of AC charging, where vehicle 1 receives a supply of AC power from the external power supply through the charging cable to perform charging of vehicle 1, the present disclosure is also applicable to DC charging, where vehicle 1 receives a supply of DC power from the external power supply through the charging cable to perform charging of vehicle 1.

Although the embodiment has described an example where the user is notified of the message that manual locking by the operation of manual operation component 90 is possible and the method for manual locking by the operation of manual operation component 90, which are indicated on display 70, it is only required that the notification can be made to the user. For example, the user may be notified of the message that manual locking by the operation of manual operation component 90 is possible and the method for manual locking by the operation of manual operation component 90 by voice using a navigation device, a separately provided audio device, and the like.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A charging system for a vehicle having a power storage device that can be charged using electric power supplied through a charging cable from outside the vehicle, the charging system comprising:

an inlet connectable to a charging connector provided at a front end of the charging cable;

a locking device configured to switch between a locked state in which the charging connector cannot be removed from the inlet and an unlocked state in which the charging connector can be removed from the inlet;

a detection device configured to detect the locked state;

a controller configured to control charging of the power storage device; and a notification device configured to provide a notification of information, the locking device being configured to switch from the unlocked state to the locked state by receiving a locking command from the controller, or by a user's manual operation, the controller being configured to, after transmitting the locking command to the locking device, permit charging of the power storage device when the locked state is detected, and not permit charging of the power storage device when the locked state is not detected, wherein when the controller does not permit charging of the power storage device after transmitting the locking command, the controller is configured to cause the notification device to provide the notification of information that switching to the locked state by the user's manual operation of a manual operation component is possible, the notification of information including at least one of an indication of an installation location of a manual operation component and an indication of how to operate the manual operation component.

2. The charging system according to claim 1, wherein when the controller does not permit charging of the power storage device after transmitting the locking command, and then the locked state is detected, the controller is configured to permit charging of the power storage device.

3. The charging system according to claim 2, wherein when the controller does not permit charging of the power storage device after transmitting the locking command, the controller is configured to transmit the locking command again to the locking device.

* * * * *

UNITED STATES PATENT AND TRADEMARK OFFICE
CERTIFICATE OF CORRECTION

| | | |
|---|---|---|
| PATENT NO. | : 10,707,623 B2 | Page 1 of 1 |
| APPLICATION NO. | : 16/225955 | |
| DATED | : July 7, 2020 | |
| INVENTOR(S) | : Toru Ando and Hisanori Ito | |

It is certified that error appears in the above-identified patent and that said Letters Patent is hereby corrected as shown below:

On the Title Page

Item (72), inventor 1, city, delete "Obu" and insert --Obu-shi Aichi-ken--, therefor.

Item (72), inventor 2, city, delete "Nagoya" and insert --Nagoya-shi Aichi-ken--, therefor.

In the Specification

In Column 3, Line 9, after "line", insert --III-III--.

In Column 3, Line 11, after "line", insert --III-III--.

In Column 4, Line 63, after "line", insert --III-III--.

Signed and Sealed this
Thirteenth Day of October, 2020

Andrei Iancu
*Director of the United States Patent and Trademark Office*